United States Patent
Kawaguchi et al.

(10) Patent No.: US 9,385,813 B2
(45) Date of Patent: Jul. 5, 2016

(54) OPTICAL FIBER TRANSMISSION LINE

(71) Applicant: SUMITOMO ELECTRIC INDUSTRIES, LTD., Osaka-shi, Osaka (JP)

(72) Inventors: Yuki Kawaguchi, Yokohama (JP); Yoshinori Yamamoto, Yokohama (JP); Masaaki Hirano, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 51 days.

(21) Appl. No.: 14/475,840

(22) Filed: Sep. 3, 2014

(65) Prior Publication Data

US 2015/0063824 A1  Mar. 5, 2015

(30) Foreign Application Priority Data

Sep. 4, 2013 (JP) ................. 2013-182997

(51) Int. Cl.
  *G02B 6/036* (2006.01)
  *G02B 6/02* (2006.01)
  *H04B 10/29* (2013.01)

(52) U.S. Cl.
  CPC ............ *H04B 10/29* (2013.01); *G02B 6/02019* (2013.01); *G02B 6/03611* (2013.01); *G02B 6/03644* (2013.01)

(58) Field of Classification Search
  None
  See application file for complete search history.

(56) References Cited

U.S. PATENT DOCUMENTS

2009/0263091 A1  10/2009  Kumano

FOREIGN PATENT DOCUMENTS

| JP | 2003-309520 A | 10/2003 |
| WO | WO 2004/059355 A1 | 7/2004 |
| WO | WO-2009/107260 A1 | 9/2009 |

OTHER PUBLICATIONS

Yoshinori Yamamoto et al., "A New Class of Optical Fibers for High Capacity Transmission," The 16th Opto-Electronics and Communication Conference, OECC, Jul. 4-8, 2011, pp. 241-244.
Yablon, Andrew, D., "Optical Fiber Fusion Splicing," ProQuest ebrary, 2005, pp. 108-115.

*Primary Examiner* — Jerry Rahll
(74) *Attorney, Agent, or Firm* — Drinker Biddle & Reath LLP (57) ABSTRACT

An optical fiber transmission line capable of minimizing the total splice loss per one span thereof. One span of an optical fiber transmission line provided between repeaters has two connection fibers and (N+1) number of optical transmission fibers. The optical connection fibers and are single mode optical fibers (SSMF) based on International standard ITU-T G.652 standard. (N+1) number of the optical transmission fibers are connected in series in order between the two optical connection fibers. The total splice loss $\alpha_{sp\_total}$ of the optical fiber transmission line as calculated from the given formula is 1.4 dB or less, when the average value of the mode field diameter of the two connection fibers is W', and the average value of the mode field diameter of (N+1) number of the optical transmission fibers is W, and the axial misalignment width at the splice point of the optical transmission fibers is d.

12 Claims, 7 Drawing Sheets

| Unit | Δ1 % | Δ2 % | 2a μm | b/a | MFD μm | Aeff μm² | Attenuation dB/km | Bend loss (R=10mm) dB/m | Dispersion ps/nm/km | Dispersion slope ps/nm²/km | Cutoff wavelength nm |
|---|---|---|---|---|---|---|---|---|---|---|---|
| Example of design 1 | 0.26 | 0.11 | 12.4 | 4.4 | 11.6 | 110 | 0.169 | 0.02 | 21.3 | 0.061 | 1580 |
| Example of design 2 | 0.25 | 0.09 | 12.8 | 3.5 | 12.0 | 119 | 0.171 | 0.05 | 21.3 | 0.061 | 1450 |
| Example of design 3 | 0.23 | 0.15 | 12.0 | 4.0 | 11.8 | 112 | 0.173 | 0.10 | 20.9 | 0.060 | 1350 |
| Example of design 4 | 0.28 | 0.14 | 13.8 | 4.8 | 12.1 | 122 | 0.171 | 0.20 | 22.1 | 0.063 | 1490 |

| | Unit | Δ1 % | Δ2 % | Δ3 % | 2a μm | b/a | a/d | MFD μm | Aeff μm² | Attenuation dB/km | Bend loss (R=10mm) dB/m | Dispersion ps/nm/km | Dispersion slope ps/nm²/km | Cutoff wavelength nm |
|---|---|---|---|---|---|---|---|---|---|---|---|---|---|---|
| Example of design 1 | | 0.08 | 0.34 | 0.09 | 4.46 | 3.56 | 2.85 | 11.3 | 110 | 0.167 | 1.02 | 20.7 | 0.060 | 1470 |
| Example of design 2 | | 0.11 | 0.35 | 0.12 | 4.36 | 3.62 | 2.78 | 11.8 | 122 | 0.160 | 0.03 | 21.0 | 0.060 | 1530 |
| Example of design 3 | | 0.10 | 0.37 | 0.10 | 4.4 | 3.67 | 2.82 | 11.2 | 107 | 0.163 | 1.92 | 20.4 | 0.059 | 1413 |
| Example of design 4 | | 0.11 | 0.31 | 0.10 | 3.4 | 3.66 | 3.62 | 11.7 | 115 | 0.164 | 7.78 | 20.1 | 0.061 | 1400 |

OPTICAL FIBER TRANSMISSION LINE

FIELD OF THE INVENTION

The present invention relates to an optical fiber transmission line.

DESCRIPTION OF THE BACKGROUND ART

Japanese Patent Application Laid-Open No. 2003-309520 (Patent Document 1) discloses an invention of a terrestrial optical fiber transmission line. In Patent Document 1, it is mentioned that a splice point exists at every 1 km or so, thereby causing splice loss in an optical fiber transmission line. Also, it is indicated that the repeater interval is usually 40 km or 80 km and that the repeater interval of 80 km or more is preferable where possible, because the link cost for an interval of 40 km would be two times as much as the link cost for an interval of 80 km.

International Publication No. 2009-107260 (Patent Document 2) discloses an invention of a terrestrial optical fiber transmission line. In Patent Document 2, it is indicated that in the case of optical fiber cables installed at present as a terrestrial transmission line in Japan, the span between optical transmission devices is 80 km and a splice point exists at every 2 km on the average. It is also stated that in the case of optical fibers having a large mode field diameter, even if an axial misalignment occurs when the fibers of the same kind are fusion spliced, the splice loss due to splicing is small, since the axial misalignment has relatively small influence on the splice loss because the ratio of the axial misalignment relative to the size of the mode field diameter is small.

Y. Yamamoto, et al, OECC2011, pp.241-244 (2011) (Non-patent Literature 1) indicates that an optical transmission fiber is connected to a pigtail of apparatus, such as an optical fiber amplifier provided in a repeater of an optical fiber communications system. In many cases, the pigtail of apparatus is a standard single mode optical fiber (SSMF) based on International standard ITU-T G. 652.

SUMMARY OF THE INVENTION

Object of the Invention

An object of the present invention is to provide an optical fiber transmission line in which the total splice loss per span can be made smaller.

Means for Achieving the Object

An optical fiber transmission line according to the present invention is used for a span between two repeaters and includes (N+1) number of optical transmission fibers of the same kind, wherein (N+1) number of the optical transmission fibers are connected in series between two connection fibers which are provided respectively in the two repeaters, and the value of Formula (1):

$$\alpha_{sp\_total}[\text{dB}] = -10\log_{10}\left[\exp\left(\frac{-4d^2}{W^2}\right)\right] \times N - 10\log_{10}\left[\left(\frac{2WW'}{W^2+W'^2}\right)^2 \exp\left(\frac{-8d^2}{W^2+W'^2}\right)\right] \times 2 \quad (1)$$

is 1.5 dB or less, wherein W' is the average value of the mode field diameter of each of the two connection fibers, W is the average value of the mode field diameter of each of (N+1) number of the optical transmission fibers, and d is the axial misalignment width at the splice point of the two connection fibers and (N+1) number of the optical transmission fibers. In many cases, the two connection fibers are based on International standard ITU-T G.652 standard. The value of the formula may be 1.4 dB or less.

In the optical fiber transmission line of the present invention, the average splice loss per splice point of the span having N number of splice points of transmission fibers mutually connected and two splice points connecting a transmission fiber and a single mode fiber may be 0.019 dB or less.

In the optical fiber transmission line of the present invention, the absolute value of Formula (2)

$$\frac{\partial \alpha_{sp\_total}}{\partial W} = -\frac{80Nd^2}{\ln 10}\frac{1}{W^3} - \frac{40}{\ln 10}\left[\frac{1}{W} - \frac{2W}{W^2+W'^2} + \frac{8Wd^2}{(W^2+W'^2)^2}\right] \quad (2)$$

may be 0.02 or less. N, which is the number of splice points for connecting (N+1) number of optical transmission fibers, may be 40 or more and 80 or less. The span loss of the optical fiber transmission line may be 15 dB or less.

In the optical fiber transmission line of the present invention, the average value W of the mode field diameter of each of (N+1) number of the optical transmission fibers may be larger than the average value W' of the mode field diameter of each of the two connection fibers, and may be 11.0 to 12.0 μm.

In the optical fiber transmission line of the present invention, the bend loss of each of (N+1) number of the optical transmission fibers may be 20 dB/m or less at the bend radius of 10 mm. Each of (N+1) number of the optical transmission fibers may have W-type profile or may have a ring core profile.

An optical fiber transmission line according to another implementation of the present invention is an optical fiber transmission line used for connection between two repeaters and includes (N+1) number of optical transmission fibers of the same kind, wherein (N+1) number of the optical transmission fibers are connected in series between two connection fibers which are provided respectively in the two repeaters, and the two connection fibers are based on International standard ITU-T G. 652 standards, and the average value W of the mode field diameter of each of (N+1) number of the optical transmission fibers is 11.0 μm to 12.0 μm, the bend loss at a bend radius of 10 mm is 20 dB/m or less, and the number N of splice points is 40 or more and 80 or less.

Effect of the Invention

The optical fiber transmission line of the present invention can make the total splice loss per span smaller.

DETAILED DESCRIPTION OF THE INVENTION

Generally one span of the optical fiber transmission line has two connection fibers both based on International standard ITU-T G.652 standard and the same kind of (N+1) optical transmission fibers connected in series between the two connection fibers, and splice loss occurs at each splice point. The total splice loss $\alpha_{sp\_}^{total}$ of the optical fiber transmission line per span is expressed as $$\alpha_{sp\_total} = \alpha_{trans} \times N + \alpha_{SSMF} \times 2, \quad (3)$$

where $\alpha_{SSMF}$ is the splice loss of an optical connection fiber and an optical transmission fiber, and $\alpha_{trans}$ is the splice loss of the optical transmission fibers.

Total splice loss $\alpha_{sp\_}^{total}$ of the optical fiber transmission line per span is dependent on the splice loss $\alpha_{SSMF}$ of the optical connection fibers and the optical transmission fibers, the splice loss $\alpha_{trans}$ of the optical transmission fibers, and the number N of splice points of the optical transmission fibers. It is possible to reduce the total splice loss $\alpha_{sp\_}^{total}$ by lessening the number N of splice points as much as possible (namely, increasing the cable unit length). However, lengthening the cable unit length would become a factor for degrading the workability in the case of conveying or installing the cable. Therefore, in the usual terrestrial optical fiber transmission line, a splice point (connection of the same kind) exists for every about 1 km.

It is possible to make the total splice loss $\alpha_{sp\_total}$ small if the splice loss $\alpha_{SSMF}$ of connecting an optical connection fiber and an optical transmission fiber, as well as the splice loss $\alpha_{trans}$ of mutually connecting optical transmission fibers, can be made small. However, it is not easy to make both of the splice loss $\alpha_{SSMF}$ and the splice loss $\alpha_{trans}$ small, and consequently it is not easy to make the total splice loss $\alpha_{sp\_total}$ per span small.

Hereafter, preferred embodiments of the present invention will be described in detail with reference to the accompanying drawings. In explanation of the drawings, the same mark will be given to identical elements, and the overlapping explanation will be omitted.

Figure 1:
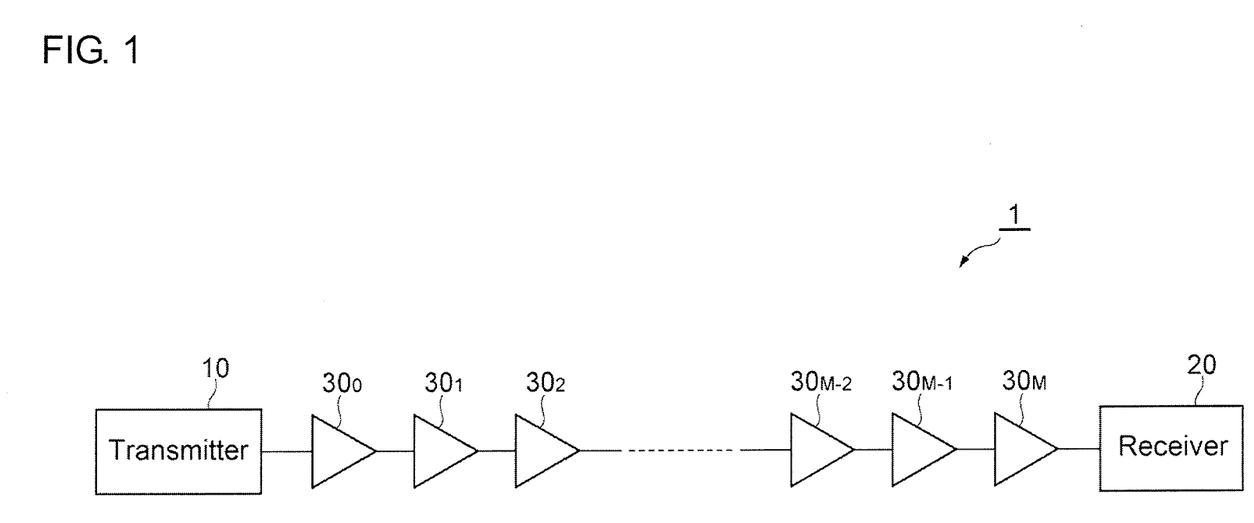
FIG. 1 is a schematic diagram showing an optical fiber communications system.

FIG. 1 is a schematic diagram showing an optical fiber communications system 1. The optical fiber communications system 1 is equipped with a transmitter 10, a receiver 20, and repeaters $30_0$-$30_M$, and optical fiber transmission lines provided between them. The signal light sent out from the transmitter 10 reaches the receiver 20 through the repeaters $30_0$-$30_M$ in order, and is received by the receiver 20. The repeaters $30_0$-$30_M$ each have apparatus, such as an optical fiber amplifier.

Figure 2:
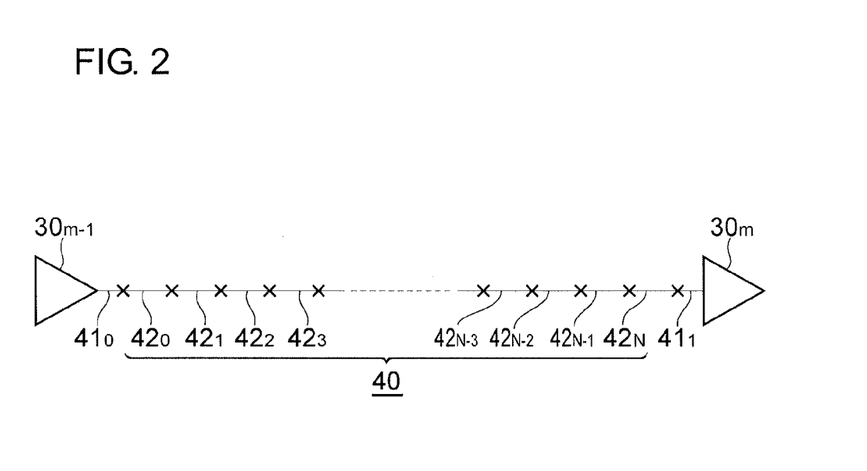
FIG. 2 is a schematic diagram showing an optical fiber transmission line.

FIG. 2 is a schematic diagram showing an optical fiber transmission line 40. FIG. 2 shows a repeater $30_{m-1}$ of the repeaters $30_0$-$30_M$, a repeater $30_m$ provided at the next step following the repeater $30_{m-1}$, and one span of the optical fiber transmission line 40 provided between the repeater $30_{m-1}$ and the repeater $30_m$. The optical fiber transmission line 40 has (N+1) optical transmission fibers $42_0$-$42_N$.

The optical connection fiber $41_0$ is an optical fiber on the output side of the repeater $30_{m-1}$. The optical connection fiber $41_1$ is an optical fiber on the input side of the repeater $30_m$. The optical connection fibers $41_0$ and $41_1$ are single mode optical fibers (SSMF) based on International standard ITU-T G.652. (N+1) number of the optical transmission fibers $42_0$-$42_N$ are connected in series in order between the two optical connection fibers $41_0$ and $41_1$. The optical connection fiber $41_0$ and the optical transmission fiber $42_0$ are fusion spliced. The optical transmission fiber $42_{n-1}$ and the optical transmission fiber $42_n$ are fusion spliced. Also, the optical transmission fiber $42_N$ and the optical connection fiber $41_1$ are fusion spliced. Usually, a repeater exists at every about 80 km interval and the optical transmission fibers are fusion spliced at every several kilometers between repeaters.

Generally, the causes of splice loss are classified as follows: gap between end-faces; angular misalignment; axial misalignment; and field distribution mismatch. Supposing the splice loss due to a gap between end-faces and angular misalignment is negligibly small, the splice loss α due to an optical fiber having a mode field diameter $W_1$ and an optical fiber having a mode field diameter $W_2$ is estimated as $$\alpha[\text{dB}] = -10\log_{10}\left[\left(\frac{2W_1W_2}{W_1^2 + W_2^2}\right)^2 \exp\left(\frac{-8d^2}{W_1^2 + W_2^2}\right)\right]. \quad (4)$$

Here, d is the width of axial misalignment of the optical fibers at a splice point.

With respect to the connection of two optical fibers of the same kind, Formula (5):

$$\frac{2W_1W_2}{W_1^2W_2^2} \cong 1 \quad (5)$$

holds true. In this specification, if Formula (6):

$$\left|\frac{2W_1W_2}{W_1^2W_2^2} - 1\right| \leq 0.2 \quad (6)$$

holds true between two optical fibers mutually connected, then, the two optical fibers are regarded as the same kind.

Therefore, the total splice loss $\alpha_{sp\_total}$ in one span of the optical fiber transmission line 40 is expressed as $$\alpha_{sp\_total}[\text{dB}] = -10\log_{10}\left[\exp\left(\frac{-4d^2}{W^2}\right)\right] \times N - \quad (7)$$
$$10\log_{10}\left[\left(\frac{2WW'}{W^2 + W'^2}\right)^2 \exp\left(\frac{-8d^2}{W^2 + W'^2}\right)\right] \times 2.$$

Here, W' is the average value of mode field diameter of the respective optical connection fibers $41_0$ and $41_1$, and W is the average value of mode field diameter of each of (N+1) number of the optical transmission fibers $42_0$-$42_N$.

Formula (7) shows that the total splice loss $\alpha_{sp\_total}$ can be made small, if the number N of splice points is lessened (namely, the cable unit length is increased). However, increasing the cable unit length will cause the degradation in workability for the conveyance or installation of the cable. Therefore, in the usual terrestrial optical fiber transmission line, a splice point (connection of the same kind) exists at every about 1 km -2 km.

The smaller the difference in the respective mode field diameter of the optical connection fiber 41 and the optical transmission fiber 42, the smaller the splice loss of the optical connection fiber 41 and the optical transmission fiber 42 becomes. On the other hand, the larger the average value W of the mode field diameter of the optical transmission fibers 42, the allowable width relative to the axial misalignment becomes larger, resulting in the smaller splice loss due to mutual connection of the optical fibers 42. Therefore, in the average value W of the mode field diameter of the optical transmission fiber 42, there is an optimal value capable of minimizing the total splice loss $\alpha_{sp\_total}$ in one span of the optical fiber transmission line 40. The average value W of the mode field diameter of the optical transmission fiber 42 for minimizing the splice loss $\alpha_{sp\_total}$ is a value of W where Formula (8):

$$\frac{\partial \alpha_{sp\_total}}{\partial W} = -\frac{80Nd^2}{\ln 10}\frac{1}{W^3} - \frac{40}{\ln 10}\left[\frac{1}{W} - \frac{2W}{W^2 + W'^2} + \frac{8Wd^2}{(W^2 + W'^2)^2}\right] \quad (8)$$

that can be obtained by differentiating Formula (7) with W is 0 (or the absolute value is 0.02 or less).

Figure 3:
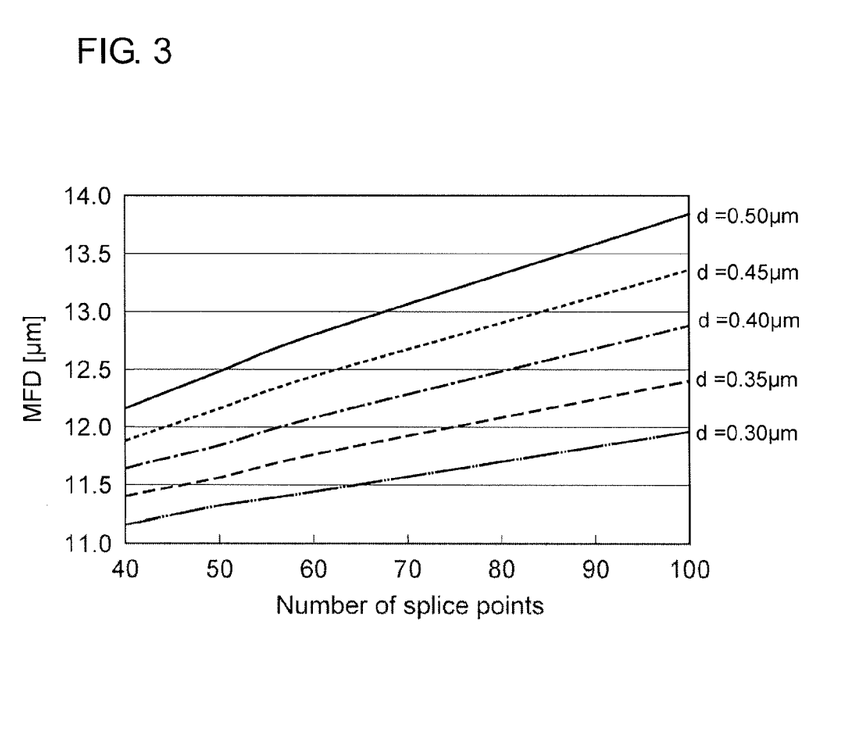
FIG. 3 is a graph showing the relationship between the number N of splice points and the average value W of the mode field diameter (MFD) of the optical transmission fiber which minimizes the total splice loss $\alpha_{sp\_total}$ of one span of the optical fiber transmission line, where the axial misalignment width d is used as a parameter.

FIG. 3 is a graph showing the relationship between the number N of splice points and the average value W of the mode field diameter (MFD) of the optical transmission fiber 42 which can minimize the total splice loss $\alpha_{sp\_total}$ in one span of the optical fiber transmission line 40, whereas the axial misalignment width d is used as a parameter. Here, the respective average value W' of mode field diameter in the optical connection fibers $41_0$ and $41_1$ was set to 10.5 μm. In FIG. 3, the average value W of the mode field diameter of the optical transmission fiber 42 for minimizing the total splice loss $\alpha_{sp\_total}$ can be obtained when the number N of splice points and the axial misalignment width d are determined.

When optical fibers are fusion-spliced by using a common optical fiber fusion splicer, the axial misalignment width d will be about 0.30 μm ~0.35 μm. In the case where the span length is 80 km and a splice point exists at every 1 km, the number N of splice points is 79. In this case, the total splice loss $\alpha_{sp\_total}$ in one span of the optical fiber transmission line 40 can be minimized by using an optical transmission fiber 42 in which the average value W of the mode field diameter is 11.6 μm ~12.1 μm.

If the number N of splice points are increased, the influence of splice loss due to splicing the same kind of fibers will become dominant, and therefore the average value W of the mode field diameter of the optical transmission fiber 42 which can minimize the total splice loss $\alpha_{sp\_total}$ in one span of optical fiber transmission line 40 becomes larger. However, if the number N of splice points increases, the total splice loss $\alpha_{sp\_total}$ will become larger. If the average value W of the mode field diameter of the optical transmission fiber 42 is increased too much, the bend loss of the optical transmission fiber 42 will become larger, and hence it is desirable that the average value W of the mode field diameter of the optical transmission fiber 42 be 13.0 μm or less.

Figure 4:
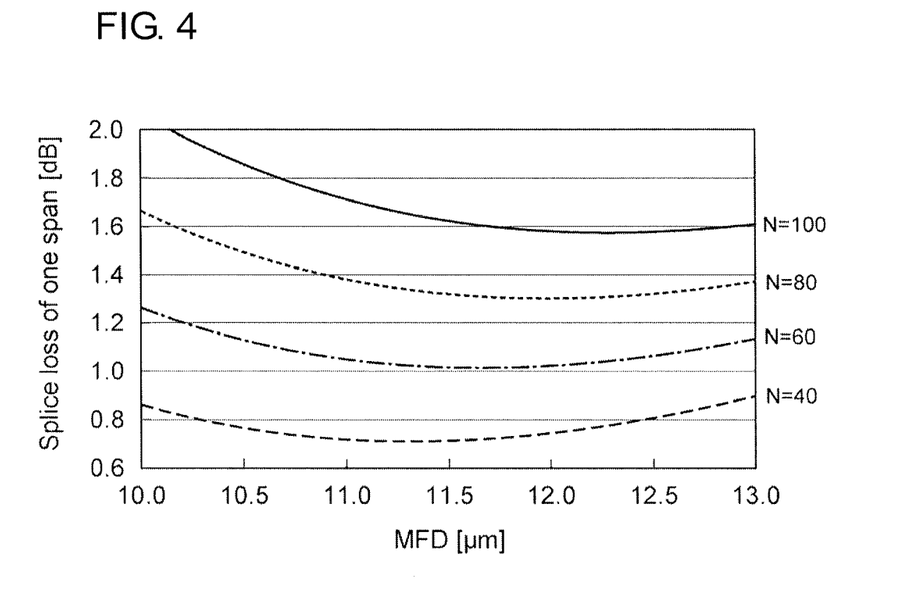
FIG. 4 is a graph showing the relationship between the total splice loss $\alpha_{sp\_total}$ of one span of the optical transmission fiber and the average value W of the mode field diameter (MFD) of the optical transmission fiber, where the number N of splice points is used as a parameter.

FIG. 4 is a graph showing the relationship between the total splice loss $\alpha_{sp\_total}$ of one span of an optical transmission fiber 40 and the average value W of the mode field diameter (MFD) of the optical transmission fiber, where the number N of splice points is used as a parameter. The total splice loss $\alpha_{sp\_total}$ can be obtained from Formula (7). Here, the axial misalignment width d was 0.35 μm. By setting the number N of splice points 40 or more and 80 or less and setting the average value W of the mode field diameter of the optical transmission fiber 42 to 11.0~12.0 μm, the total splice loss $\alpha_{sp\_total}$ can be made 1.5 dB or less, which is smaller than the case where the average value W of the mode field diameter of the optical transmission fiber 42 is 10.5 μm (the mode field diameter of SSMF).

Figure 5:
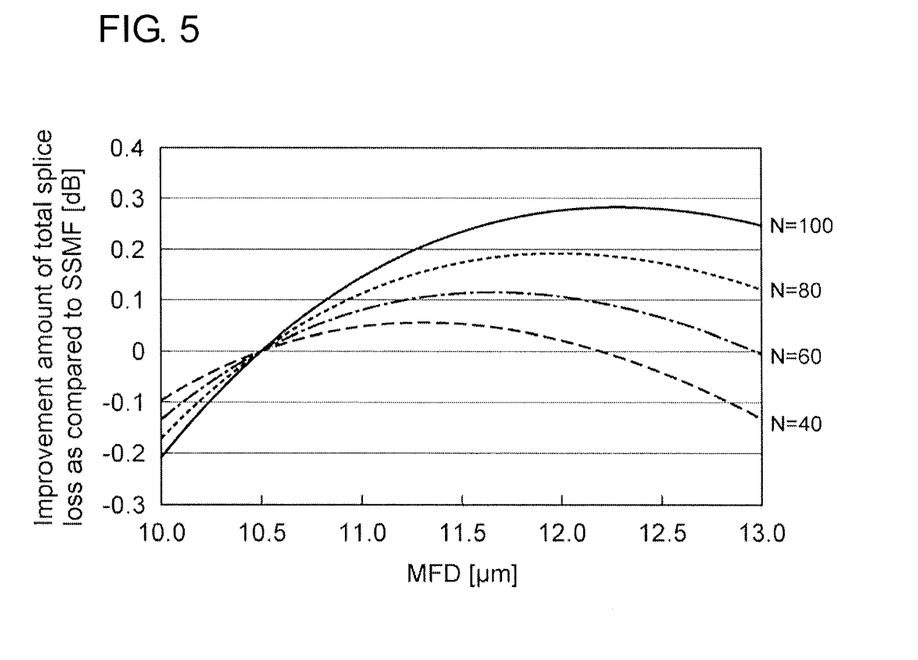
FIG. 5 is a graph showing the relationship between the average value W of the mode field diameter (MFD) of the optical transmission fiber and the improvement amount of total splice loss $\alpha_{sp\_total}$ of one span of the optical fiber transmission line on the basis of SSMF having a mode field diameter of 10.5 μm, where the number N of splice points is used as a parameter.

FIG. 5 is a graph showing the relationship between the average value W of the mode field diameter (MFD) of the optical transmission fiber and the improvement amount of total splice loss $\alpha_{sp\_total}$ of one span of the optical fiber transmission line on the basis of SSMF having a mode field diameter of 10.5 μm, where the number N of splice points is used as a parameter. By setting the average value W of the mode field diameter of the optical transmission fiber 42 to 11.0~12.0 μm, the splice loss $\alpha_{sp\_total}$ can be reduced as compared with the case where the SSMF is used.

The span loss $\alpha_{span}$ of one span of optical fiber transmission line 40 can be expressed as $$\alpha_{span} = \alpha_{fiber} \times L + \alpha_{sp\_total}, \quad (9)$$

where $\alpha_{sp\_total}$ is total splice loss, $\alpha_{fiber}$ is attenuation of an optical fiber, and L is span length. In order to make the span loss $\alpha_{span}$ small, it is important to reduce the attenuation $\alpha_{fiber}$ of an optical fiber, as well as the total splice loss $\alpha_{sp\_total}$.

The following Table shows composition of optical fiber transmission lines in the examples of the invention and comparative examples.

TABLE

| | Number of splice points | MFD μm | Total splice loss dB | Average splice loss dB/splice point | Fiber attenuation dB/km | Span loss dB |
|---|---|---|---|---|---|---|
| Example 1 | 40 | 11.5 | 0.71 | 0.017 | 0.170 | 14.3 |
| Example 2 | 40 | 12.3 | 0.77 | 0.018 | 0.170 | 14.4 |
| Example 3 | 40 | 12.3 | 0.77 | 0.018 | 0.164 | 13.9 |
| Example 4 | 40 | 12.3 | 0.77 | 0.018 | 0.175 | 14.8 |
| Example 5 | 60 | 11.0 | 1.05 | 0.017 | 0.170 | 14.7 |
| Example 6 | 60 | 11.6 | 1.01 | 0.017 | 0.170 | 14.6 |
| Example 7 | 60 | 11.6 | 1.01 | 0.017 | 0.164 | 14.1 |
| Example 8 | 60 | 11.6 | 1.01 | 0.017 | 0.175 | 15.0 |
| Example 9 | 80 | 10.5 | 1.40 | 0.017 | 0.170 | 15.0 |
| Example 10 | 80 | 12.0 | 1.30 | 0.016 | 0.170 | 14.9 |
| Example 11 | 80 | 12.0 | 1.30 | 0.016 | 0.164 | 14.4 |
| Example 12 | 80 | 12.0 | 1.30 | 0.016 | 0.175 | 15.3 |
| Comparative example 1 | 40 | 10.5 | 0.72 | 0.017 | 0.190 | 15.9 |
| Comparative example 2 | 60 | 10.5 | 1.06 | 0.017 | 0.190 | 16.3 |
| Comparative example 3 | 80 | 10.5 | 1.40 | 0.017 | 0.190 | 16.6 |
| Comparative example 4 | 100 | 10.5 | 1.75 | 0.017 | 0.190 | 17.0 |
| Comparative example 5 | 40 | 11.8 | 0.73 | 0.017 | 0.170 | 14.3 |
| Comparative example 6 | 60 | 11.8 | 1.02 | 0.016 | 0.170 | 14.6 |

TABLE-continued

|  | Number of splice points | MFD μm | Total splice loss dB | Average splice loss dB/splice point | Fiber attenuation dB/km | Span loss dB |
|---|---|---|---|---|---|---|
| Comparative example 7 | 80 | 11.8 | 1.30 | 0.016 | 0.170 | 14.9 |
| Comparative example 8 | 100 | 11.8 | 1.59 | 0.016 | 0.170 | 15.2 |

For example, if a SSMF having a mode field diameter of 10.5 μm and attenuation of 0.19 dB/km (Comparative example 3) is used as the optical transmission fiber 42 under the conditions in which the span length L is 80 km, the number N of splice points is 80, and the axial misalignment width d is 0.35 μm, the span loss $\alpha_{span}$ is 16.6 dB from Formula (9). On the other hand, if a pure silica core fiber having an attenuation of 0.17 dB/km and a mode field diameter of 12.0 μm is used as the optical transmission fiber 42 (Example 10), the span loss $\alpha_{span}$ becomes 14.9 dB, enabling an improvement of 1.7 dB as compared with the case where the SSMF is used.

The average splice loss $\alpha_{sp\_ave}$ per splice point of a span having N number of splice points of transmission fibers mutually connected and two splice points connecting a transmission fiber and a single mode fiber, can be expressed by:

$$\alpha_{sp\_ave} = \frac{\alpha_{sp\_total}}{N+2}. \quad (10)$$

The splice loss of SSMF(s) mutually connected in the case of d =0.35 μm is 0.019 dB according to Formula (2), and the average splice loss calculated from Formula (6) can be 0.019 dB or less by appropriately designing the number of MFD and the number of splice points.

Figure 6:
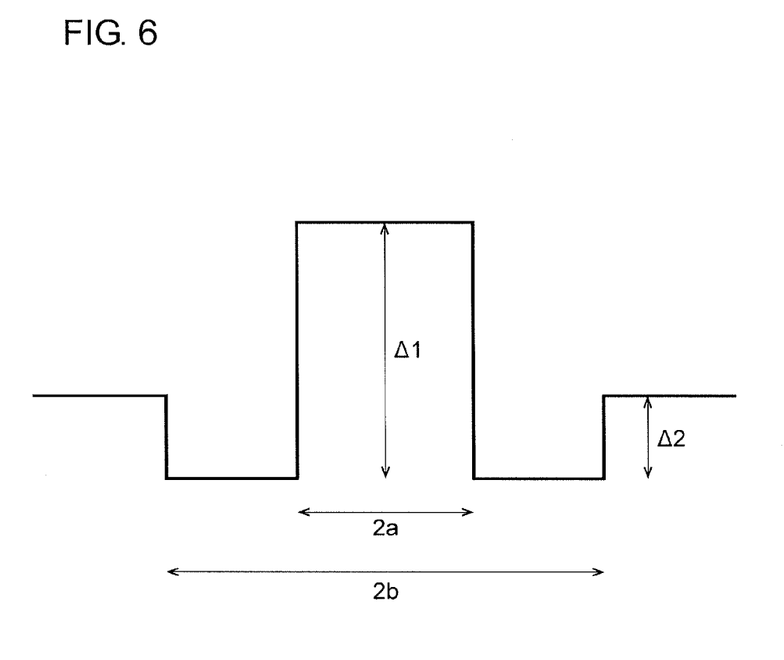
FIG. 6 is a schematic diagram showing a W-type profile.
Figure 7:
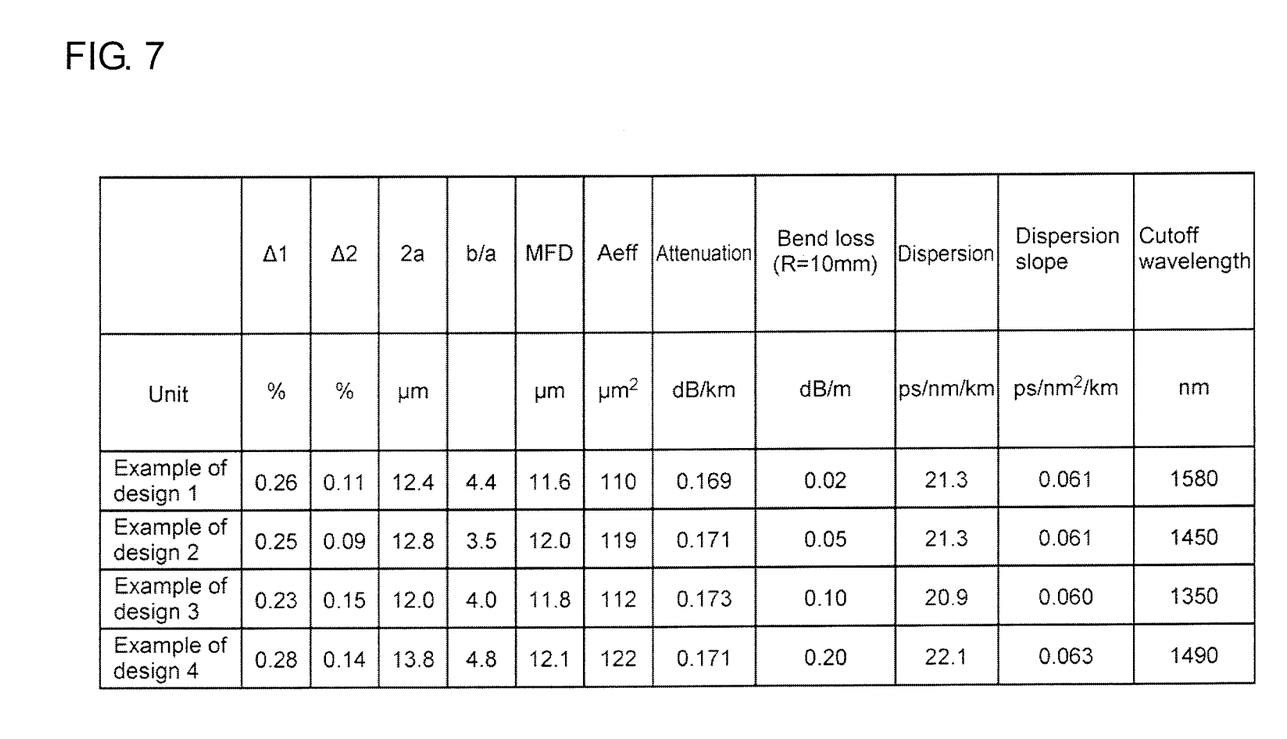
FIG. 7 is a table showing an example of design of the optical fiber having the W-type profile.
Figure 8:
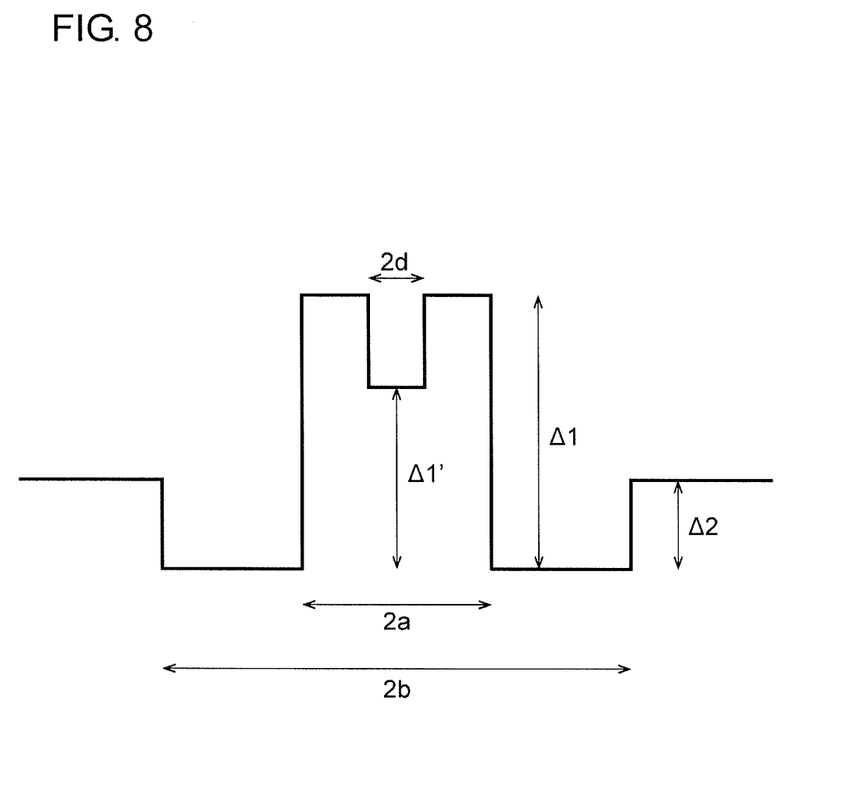
FIG. 8 is a schematic diagram showing a ring core profile.
Figure 9:
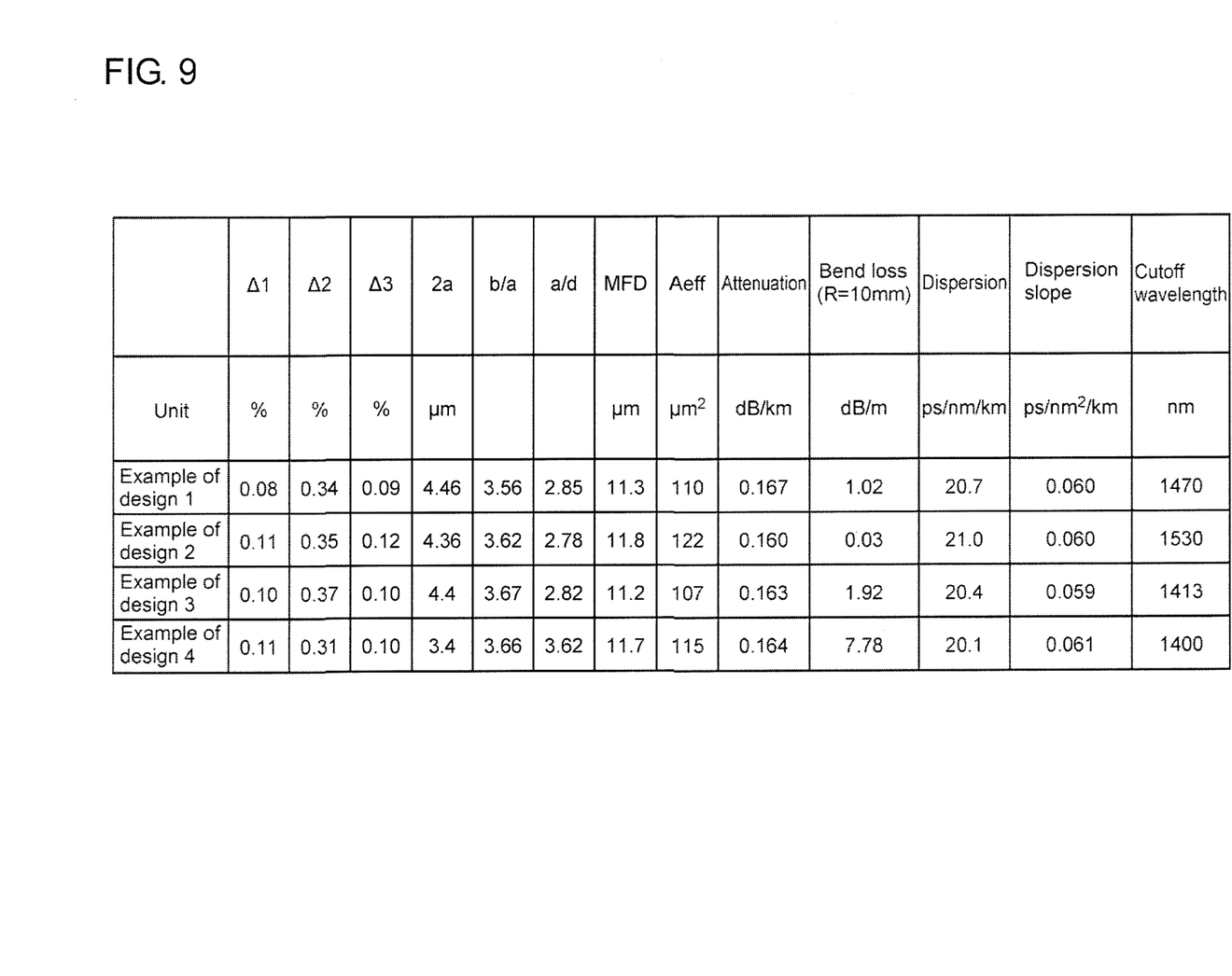
FIG. 9 is a table showing an example of design of an optical fiber having the ring core profile.

In an actual optical fiber communications system, the bend loss of an optical transmission fiber 42 needs to be low, since the fiber is bent to store its extra length portion. For example, it is desirable that the bend loss of the optical transmission fiber 42 bent at a bending radius of 10 mm be 20 dB/m or less at the wavelength of 1550 nm. The optical transmission fiber 42 may have W-type index profile in which a depressed region of low refractive index is provided between the central core and a clad as shown in FIG. 6. FIG. 7 is a table showing design examples of an optical fiber having a W-type index profile. The optical transmission fiber 42 may have a ring core index profile in which a depressed region of low refractive index is provided at the core central part as shown in FIG. 8. FIG. 9 is a table showing design examples of an optical fiber having a ring core index profile. In any of the cases, it is possible to have low bend loss property.

The design method of the optical fiber transmission line 40 is as follows. First, transmission optical fibers 42 are mutually fusion-spliced using a fusion splicer, and the splice loss α of the splice point concerned is measured, and the axial misalignment width d is estimated from Formula (4) on the basis of the splice loss α acquired by the measurement. Next, the cable unit length is determined, and the number N of splice points is sought on the basis of the cable unit length thus determined and the span length. Next, the average value W of mode field diameter of the optical transmission fiber 42 in which the total splice loss $\alpha_{sp\_total}$ is minimized is calculated using Formula (8). And then, the total splice loss $\alpha_{sp\_total}$ in one span of the optical fiber transmission line 40 is calculated using Formula (7).

What is claimed is:

1. An optical fiber transmission line used for a span between two repeaters, comprising (N+1) number of optical transmission fibers of the same kind, wherein
   (N+1) number of the optical transmission fibers are connected in series between two connection fibers provided respectively in the two repeaters, and
   the value of the following formula:

$$\alpha_{sp\_total}[dB] = \\ -10\log_{10}\left[\exp\left(\frac{-4d^2}{W^2}\right)\right] \times N - 10\log_{10}\left[\left(\frac{2WW'}{W^2+W'^2}\right)^2 \exp\left(\frac{-8d^2}{W^2+W'^2}\right)\right] \times 2$$

is 1.5 dB or less, wherein the average value of the mode field diameter of each of the two connection fibers is W', the average value of the mode field diameter of each of (N+1) number of the optical transmission fibers is W, and the axial misalignment width at the splice point of the two connection fibers and (N+1) number of the optical transmission fibers is d,
   wherein the two connection fibers are based on International standard ITU-T G.652 standard.

2. An optical fiber transmission line as set forth in claim 1, wherein the value of the following formula:

$$\alpha_{sp\_total}[dB] = \\ -10\log_{10}\left[\exp\left(\frac{-4d^2}{W^2}\right)\right] \times N - 10\log_{10}\left[\left(\frac{2WW'}{W^2+W'^2}\right)^2 \exp\left(\frac{-8d^2}{W^2+W'^2}\right)\right] \times 2$$

is 1.4 dB or less.

3. An optical fiber transmission line as set forth in claim 1, wherein the average splice loss $\alpha_{sp\_ave}$ per splice point of the span is 0.019 dB or less in the case the span has N number of splice points of transmission fibers mutually connected and two splice points connecting a transmission fiber and a single mode fiber.

4. An optical fiber transmission line as set forth in claim 1, wherein the absolute value of the following formula:

$$\frac{\partial \alpha_{sp\_total}}{\partial W} = -\frac{80Nd^2}{\ln 10}\frac{1}{W^3} - \frac{40}{\ln 10}\left[\frac{1}{W} - \frac{2W}{W^2+W'^2} + \frac{8Wd^2}{(W^2+W'^2)^2}\right]$$

is 0.02 or less.

5. An optical fiber transmission line as set forth in claim 1, wherein N, the number of splice points for connecting (N+1) number of optical transmission fibers, is 40 or more and 80 or less.

6. An optical fiber transmission line as set forth in claim 1, wherein the span loss of the optical fiber transmission line is 15 dB or less.

7. An optical fiber transmission line as set forth in claim 1, wherein the average value W of the mode field diameter of each of (N+1) number of the optical transmission fibers may be larger than the average value W' of the mode field diameter of each of the two connection fibers.

8. An optical fiber transmission line as set forth in claim 1, wherein the average value W of the mode field diameter of each of (N+1) number of the optical transmission fibers is 11.0 to 12.0 m.

9. An optical fiber transmission line as set forth in claim 1, wherein the bend loss of each of (N+1) number of the optical transmission fibers is 20 dB/m or less at the bend radius of 10 mm.

10. An optical fiber transmission line as set forth in claim 1, wherein each of (N+1) number of the optical transmission fibers has W-type index profile.

11. An optical fiber transmission line as set forth in claim 1, wherein each of (N+1) number of the optical transmission fibers has a ring core index profile.

12. An optical fiber transmission line comprising (N+1) number of optical transmission fibers of the same kind and used for connection between two repeaters, wherein (N+1) number of the optical transmission fibers are connected in series between two connection fibers provided respectively in the two repeaters, the two connection fibers being based on International standard ITU-T G.652 standard; the average value W of the mode field diameter of each of (N+1) number of the optical transmission fibers is 11.0 to 12.0 µm; the bend loss thereof is 20 dB/m or less at the bend radius of 10 mm; and the number N of splice points for connecting (N+1) number of the optical transmission fibers is 40 or more and 80 or less.

\* \* \* \* \*